United States Patent [19]

Shimotakahara

[11] 3,942,873
[45] Mar. 9, 1976

[54] REFLECTING DIFFRACTION GRATING FOR MINIMIZING ANOMALIES

[75] Inventor: Tsumoru Shimotakahara, Katsuta, Japan

[73] Assignee: Hitachi, Ltd., Japan

[22] Filed: Dec. 9, 1974

[21] Appl. No.: 531,163

[30] Foreign Application Priority Data

Dec. 14, 1973 Japan............................... 48-138632

[52] U.S. Cl................................................ 350/162 R
[51] Int. Cl.² ........................................... G02B 5/18
[58] Field of Search............. 350/162 R; 117/107 R

[56] References Cited
UNITED STATES PATENTS

| | | | |
|---|---|---|---|
| 3,045,532 | 7/1962 | Staunton | 350/162 R |
| 3,046,839 | 7/1962 | Bird et al. | 350/162 R |
| 3,237,508 | 3/1966 | Keller et al. | 350/162 R |

*Primary Examiner*—Ronald J. Stern
*Assistant Examiner*—Jon W. Henry
*Attorney, Agent, or Firm*—Craig & Antonelli

[57] ABSTRACT

In a reflecting diffraction grating having a plurality of grooves for light diffraction, each groove being formed by a reflecting surface and a rear surface, the rear surface is so formed that light coming thereupon is subjected to an irregular reflection.

15 Claims, 4 Drawing Figures

3,942,873

REFLECTING DIFFRACTION GRATING FOR MINIMIZING ANOMALIES

FIELD OF THE INVENTION

The present invention relates to a reflecting diffraction grating and more particularly to such a grating for minimizing anomalies.

DESCRIPTION OF THE PRIOR ART

In general, the performance of a diffraction grating can be represented as a function of the accuracy of the wave surface of diffracted light, light diffraction efficiency and stray light. As the demand for a spectrophotometer having a high performance is increased and unique applications thereof are developed, abnormalities in the intensity distribution of diffracted light or socalled "anomaly" of the diffraction grating provides a serious problem to be solved. When the incident angle of light is varied progressively, a certain order of diffracted light tends to become in parallel with the surface of the diffraction grating and will ultimately disappear due to absorption by an another order of diffracted light. This phenomenon which does not follows the Fraunhofer theory of diffraction is referred to as an "anomaly". Occurrence of the anomaly can be explained by a kind of resonant interference between the diffracted light from the reflecting surface of the diffraction grating and the undesirable light reflected by the rear surface of the grating. For a better understanding of the present invention, the anomaly and the diffraction phenomena in an echelette diffraction grating which is a conventional typical reflecting diffraction grating will be discussed with reference to FIGS. 1 and 2 of the accompanying drawings.

Figure 1:
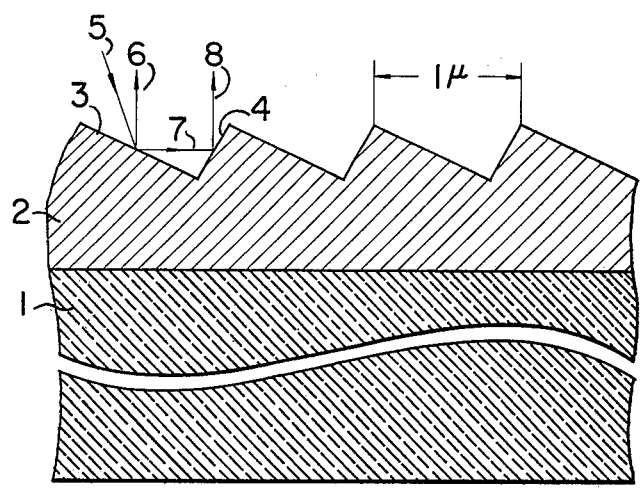
FIG. 1 is a longitudinal sectional view of a conventional echelette diffraction grating to illustrate schematically the anomaly phenomenon.
Figure 2:
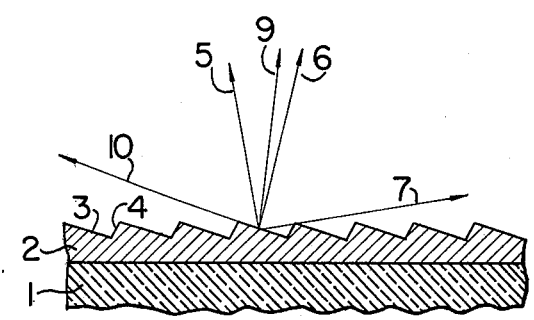
FIG. 2 is a sectional view of the echelette diffraction grating to illustrate the diffraction mechanism thereof.

FIG. 1 shows a conventional echelette diffraction grating in a section taken in the direction perpendicularly to the running direction of grooves formed therein. FIG. 2 is a schematic model diagram to illustrate the diffraction phenomenon of the conventional echelette grating. In FIG. 1, reference numeral 1 indicates a glass substrate which is coated with an aluminum film 2 formed by vacuum evaporation or the like process. The aluminum film 2 has a surface formed with sawtooth-like grating grooves arrayed in parallel to one another with equidistance of about 1 μ. Numeral 3 denotes one of the two surfaces constituting the groove ruled on the aluminum film 2, which surface (hereinafter referred to as a reflecting surface) is inclined relatively gently and usually serves to reflect the incident light. The other surface constituting the groove of the diffraction grating and designated by numeral 4 is inclined relatively steeply as compared with the reflecting surface 3. The surface 4 will hereinafter be referred to as a rear surface. Numeral 5 represents light incident on the reflecting surface 3, numeral 6 a +1st order of diffracted light dispersed by the reflecting surface 3 in correspondence with the incident light 5, numeral 7 a +2nd order of diffracted light produced by the reflecting surface 3 from the incident light 5, and numeral 8 a double-diffracted light derived from the diffraction light 7 and dispersed again by the rear surface 4. In FIG. 2, numeral 9 represents a zero order of diffracted light produced from the incident light 5 at the reflecting surface 3 and numeral 10 a −1st order of diffracted light produced from the incident light 5 at the reflecting surface 3.

Assuming that monochromatic light falls on the reflecting surface 3 of the diffraction grating as the incident light 5 in the state shown in FIG. 2, the incident light is diffracted in various directions in dependence of the order numbers of the diffraction. If the incident light 5 is rotated clockwise starting from the state shown in FIG. 2, the +2nd order of diffracted light 7 runs in a direction tangent to the surface of the diffraction grating and will ultimately disappear. In this case, a portion of the diffracted light 7 is absorbed by the +1st order of diffracted light, which results in an abnormality in the intensity distribution of the +1st order of diffracted light. This is the so-called anomaly phenomenon. After experimental research carried out by the present inventor, it has been microscopically observed that the anomaly phenomenon may be ascribed to the fact that the 1st order of diffracted light 6 dispersed at the reflecting surface 3 of the diffraction grating and the double-diffracted light 8 produced by the dispersion of the +2nd order of diffracted light 7 at the rear surface 4 of the diffraction grating as shown in FIG. 1 are reflected in the same direction and interfere with each other. Due to such an anomaly phenomenon, the spectrophotometers available at present can not avoid the following disadvantages:

1. It is difficult to attain a good reproducibility of light diffraction efficiency.
2. In the case of measuring an absorption spectrum of a specimen with the air of monochromatic light flux, abrupt variation in light diffraction efficiency is likely to be taken erroneously for absorption by the specimen.
3. When abrupt variation occurs in the intensity distribution of diffracted light due to the anomaly, an electric system for a photodetector can not instantly follow such a variation in the responding operation.
4. Most of spectrophotometries are carried out by exchanging two-wavelength spectrometry and two-light flux measurement with two diffraction gratings. In such a case, if the abrupt variation in the intensity distribution of diffracted light should occur at least in one of the diffraction gratings due to the anomaly particularly in the case of the two-light flux measurement, the difference in the light intensity will involve errors in the results of measurement.

SUMMARY OF THE INVENTION

An object of the present invention is to provide a reflecting diffraction grating which is extremely insusceptible to the anomaly.

This object of the invention is attained in such a manner that a rear surface constituting a groove of the reflecting diffraction grating in cooperation with a reflecting surface is so formed that light coming thereupon is subjected to an irregular reflection.

The above and other objects, features and advantages of the invention will become apparent when reading the following detailed description of preferred embodiment of the invention in conjunction with the accompanying drawings.

DETAILED DESCRIPTION OF THE PREFERRED EMBODIMENT

Figure 3:
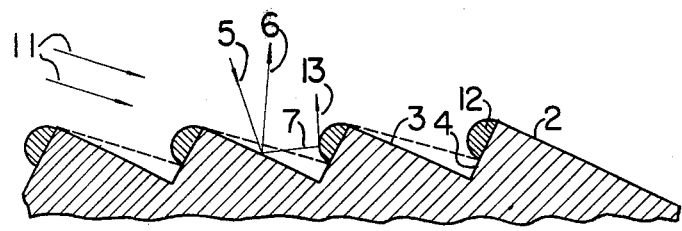
FIG. 3 is a longitudinal sectional view of a diffraction grating according to the present invention.

Referring to FIG. 3 showing a reflecting diffraction grating according to the present invention in a longitudinal section, the same reference numerals as those in FIGS. 1 and 2 represent the same functional matters. Accordingly, repeated explanation of these numerals will be unnecessary.

In FIG. 3, layers 12 having a convex-configuration, as shown, are deposited on the rear surfaces 4 of the grooves by vacuum evaporation along the direction indicated by arrows 11 according to the invention. The evaporated material for the layer 12 is aluminum (Al) in this embodiment. However, it should be appreciated that a metallic material such as chromium (Cr), a nonmetallic material such as magnesium fluoride ($MgF_2$) as well as a semiconductor material such as silicon (Si) or germanium (Ge) may be employed for the layer 12. Furthermore, any other material which can be evaporated on the rear surface may be optionally employed. The thickness of each evaporated material layer should preferably lie in the range from $d/20$ to $d/5$, wherein $d$ represents the grating constant or a distance between the grooves. It has been found that the thickness in the order of $d/10$ will bring about most desirable results. If the thickness of the evaporated material layer 12 is selected greater than $d/5$, the decrease in the light diffraction efficiency has been observed due to the reduction in the effective area of the reflecting surface 3. On the other hand, when the layer 12 is deposited in thickness smaller than $d/20$, the amount of interference of the reflected light at the rear surface 4 with the light dispersed from the reflecting surface 3 increases, so that the undesirable anomaly phenomenon will become more appreciable. In FIG. 3, reference numeral 13 indicates the double-diffracted light produced from the +2nd order of diffraction light 7 dispersed at the reflecting surface 3 which has undergone the second diffraction at the evaporated material layer 12 deposited on the rear surface 4.

With the structure of the reflecting diffraction grating embodying the invention as is shown in FIG. 3, the double-diffracted light 13 at the rear surface 4 is dispersed in various directions and irregularly reflected, so that the light intensity thereof is remarkably lowered. Consequently, intereference with the +1st order of diffracted light 6 becomes negligible, which in turn results in a remarkable reduction of the anomaly phenomenon.

Figure 4:
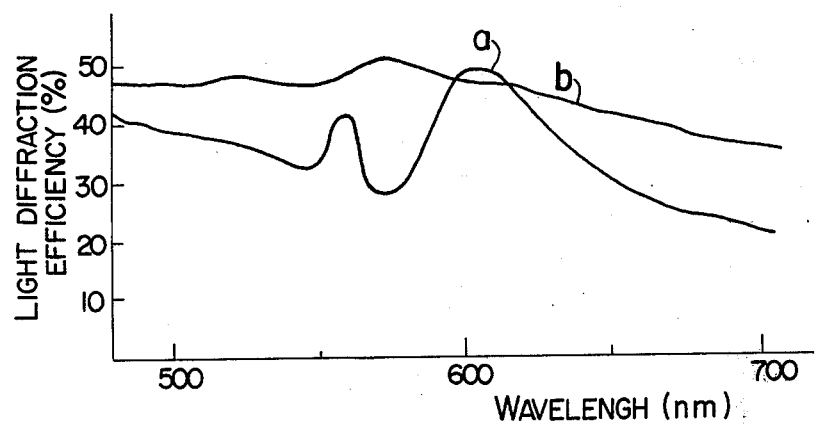
FIG. 4 shows graphically the spectrometric light diffraction efficiency characteristic obtained by using a diffraction grating according to the invention in comparison with the corresponding characteristic of a conventional diffraction grating.

The performance of the reflecting diffraction grating according to the invention is shown in FIG. 4 in comparison with that of a conventional reflecting diffraction grating. In FIG. 4, the light diffraction efficiency is taken along the ordinate in percentage with the intensity of incident monochromatic light taken at 100 %, while the wavelength is taken along the abscissa. Curve (b) represents the light diffraction efficiency of the reflecting diffraction grating according to the invention, while curve (a) indicates that of the conventional diffraction grating. As can be seen in FIG. 4, in the case of the conventional reflecting diffraction grating, abrupt variations are observed in the intensity distribution characteristic in the range of wavelength from 550 nm to 650 nm. More particularly, the intensity variation as great as about 20 % is brought about due to the anomaly phenomenon. To the contrary, the intensity variation is minimized at the range of about 5 % in the case of the reflecting diffraction grating according to the invention.

In summary, in a preferred embodiment according to the invention, the material for irregular reflection is deposited only on the rear surface of the groove of the diffraction grating in an inclined direction through a vacuum evaporation process in thickness of 1/20 to 1/5 of the grating constant $d$. The evaporated material serves to irregularly reflect light coming upon the rear surface, thereby restricting the anomaly to a minimum, which thus enhances the reproducibility of the light diffraction efficiency. When the reflecting diffraction grating according to the invention was employed as dispersing means in the two-wavelength spectrophotometry, the yield in the quality of measurement could surprisingly be enhanced from 20 % of the conventional grating to 60 %.

In the aforementioned preferred embodiment, the vacuum evaporation of the layer 12 onto the rear surface along the inclined direction is carried out by selecting the inclined evaporating angle so that the evaporated material can never be deposited on the reflecting surface. The thus deposited material layer by the evaporation in the inclined direction provides a rough surface which is well suited for irregular reflection.

In the above embodiment, the vacuum-evaporated material layer 12 formed only on the rear surface of the grating groove has been described as means for the irregular reflection. However, the invention is not restricted to such a provision of the irregular reflection surface. In reality, the rear surface having a structure suitable for the desired irregular reflection may be formed by means of ion bombardment, spattering or the like methods.

From the foregoing description, it will be appreciated that the present invention has provided a practically very useful reflecting diffraction grating which is little susceptible to anomaly and has good reproducibility.

I claim:

1. In a reflecting diffraction grating comprising a plurality of grooves for light diffraction, each of said grooves being formed by first and second reflecting surfaces, the improvement in that said second reflecting surface has a convex configuration for preventing light reflected from said first reflecting surface from interfering with light reflected from said second reflecting surface and for scattering thereat light reflected from said second reflecting surface, said convexly configured second reflecting surface having a surface roughness greater than said first reflecting surface thereby to reduce anomalies.

2. The improved reflecting diffraction grating according to claim 1, wherein the convex configuration of said second reflecting surface is formed by an evaporable material which is evaporated onto said second reflecting surface.

3. The improved reflecting diffraction grating according to claim 2, wherein said evaporable material has a thickness lying in the range from 1/20 to 1/5 of the grating constant.

4. The improved reflecting diffraction grating according to claim 2, wherein said evaporable material has a thickness of one-tenth of the grating constant.

5. The improved reflecting diffraction grating according to claim 2, wherein said evaporable material comprises at least one material selected from the group consisting of aluminum, chromium, magnesium fluoride, silicon and germanium.

6. The improved reflecting diffraction grating according to claim 3, wherein said evaporable material comprises at least one material selected from the group consisting of aluminum, chromium, magnesium fluoride, silicon and germanium.

7. The improved reflecting diffraction grating according to claim 4, wherein said evaporable material comprises at least one material selected from the group consisting of aluminum, chromium, magnesium fluoride, silicon and germanium.

8. In a reflecting diffraction grating comprising a plurality of grooves for light diffraction, each of said grooves being formed by first and second aluminum layers defining first and second reflecting surfaces, respectively, the improvement in that only a surface of said second aluminum layer has thereon a convex configuration formed by at least one evaporable material selected from the group consisting of aluminum, chromium, magnesium fluoride, silicon and germanium, said convex configuration preventing light reflected from the surface of said first aluminum layer from interfering with light reflected from the surface of said second aluminum layer and scattering thereat light reflected from the surface of said second aluminum layer, said convexly configured second reflecting surface having a surface roughness greater than said first reflecting surface thereby to reduce anomalies.

9. The improved diffraction grating according to claim 8, wherein said evaporable material has a thickness lying in the range from 1/20 to 1/5 of the grating constant.

10. In a reflecting diffraction grating comprising a light reflecting supporting medium having a plurality of light reflecting grooves ruled in a surface thereof, the improvement wherein each groove consists of a first planar reflecting surface having first and second edges;

a second planar reflecting surface one edge of which intersects the first edge of said first planar reflecting surface and the other edge of which intersects the second edge of the first planar surface of an adjacent groove, and a convex-shaped reflecting projection having a surface roughness greater than said first reflecting surface and extending from said second planar reflecting surface and having a first edge contiguous with said other edge of said second planar surface and a second edge intersecting said second planar surface at a location spaced apart from the intersection of said second reflecting surface with said first reflecting surface by the exposed planar portion of said second reflecting surface therebetween.

11. The improved reflection diffraction grating according to claim 10, wherein the thickness of said convex-shaped projection lies in a range of 1/20 to 1/5 of the grating constant.

12. The improved reflection diffraction grating according to claim 11, wherein the thickness of said convex-shaped projection is 1/10 of the grating constant.

13. The improved reflection diffraction grating according to claim 10, wherein the material of which said convex-shaped projection is made is a material selected from the group consisting of aluminum, chromium, magnesium fluorid, silicon and germanium.

14. The improved reflection diffraction grating according to claim 10, wherein the distance between the first and second edges of said convex-shaped projection along the surface of said second planar reflecting surface is greater than distance along said second planar reflecting surface between the one edge of said second planar reflecting surface and the intersection of said second planar reflecting surface with the second edge of said convex-shaped projection.

15. The improved reflection diffraction grating according to claim 14, wherein the distance between the edges of said first planar reflecting surface is greater than the distance between the edges of said second planar reflecting surface.

* * * * *